(No Model.)

C. E. CAHOONE.
HARNESS SADDLE.

No. 318,232. Patented May 19, 1885.

Attest:
Fred. S. Adams,
Fredk. F. Campbell.

Inventor:
Charles E. Cahoone,
by Drake & Co.
Attys.

UNITED STATES PATENT OFFICE.

CHARLES E. CAHOONE, OF NEWARK, NEW JERSEY.

HARNESS-SADDLE.

SPECIFICATION forming part of Letters Patent No. 318,232, dated May 19, 1885.

Application filed March 5, 1885. (No model.)

*To all whom it may concern:*

Be it known that I, CHARLES E. CAHOONE, a citizen of the United States, residing at Newark, in the county of Essex and State of New Jersey, have invented certain new and useful Improvements in Harness-Saddles; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to reduce the cost and facilitate the process of manufacturing harness-saddles, and to secure an article of improved appearance; and it consists in the arrangements and combinations of parts, substantially as will be hereinafter set forth, and finally embodied in the clauses of the claims.

Figure 1:
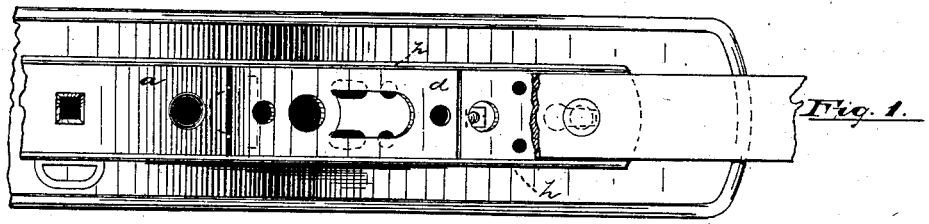
Figures 2, 3, 4:
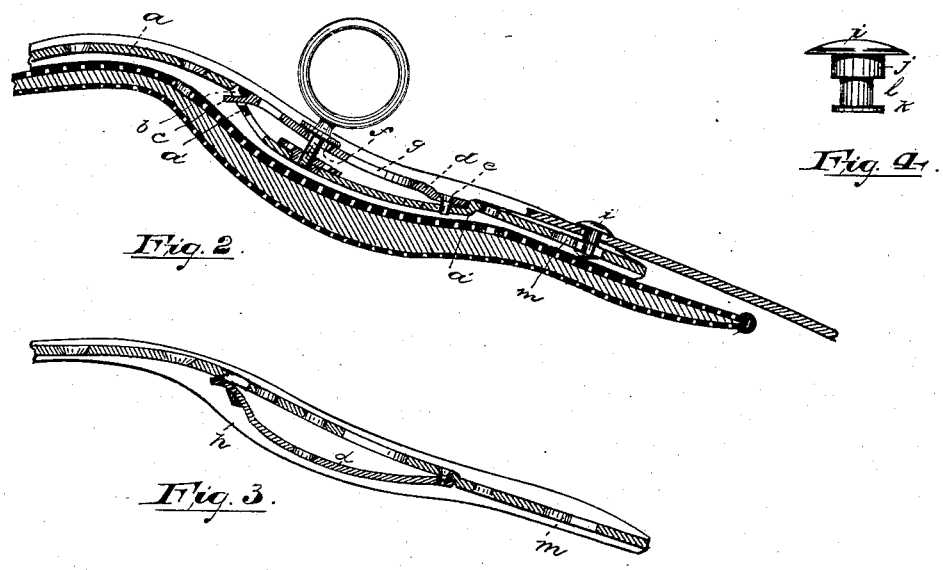

Referring to the accompanying drawings, in which like letters of reference indicate corresponding parts in each of the figures, Figure 1 is a plan of a part of a saddle with the top portions removed to show the tree. Fig. 2 is a vertical longitudinal section of said saddle. Fig. 3 is a sectional view illustrating a certain modified construction, and Fig. 4 shows in detail a certain bolt employed in holding parts of the saddle together.

In said drawings, $a$ indicates the saddle-tree, which is depressed at and near the point where it engages the terret, opposite inclines, shoulders, or bearings $a'$ $a'$ being formed on the tree considerably above the portions of the plate between. One of the bearings is perforated, as at $b$, to receive a tongue, $c$, of a cover, $d$, which last is preferably straight, or nearly so, when viewed edgewise, and extends across the depression in the tree from one bearing $a'$ to the other, forming a chamber beneath, into which the terret-nut can be readily inserted and therein easily manipulated. By this construction a double-tree is formed the inner or under portion of which has a greater curve to conform to the shape of the horse's back, so that the pad beneath will require less stuffing than is usually given it, while the upper portion secures a straighter outline corresponding with the line of draft over the horse's back. The tongue $c$ being inserted in the perforation $b$, the other end is riveted, as at $e$, so that the cover is held permanently and securely in position at an expense of but one rivet. The cover is provided with an opening, $g$, to allow the passage of the terret-nut, and a perforation, $f$, through which the shank of the terret passes when secured in place. The side flanges, $h$ $h$, formed on the tree extend upward on both sides of the cover, and tend to protect the same and hold it more firmly in position. The relation of the cover and tree proper may be reversed, as in Fig. 3, the cover in that event being preferably concaved and secured to the under side of the tree. The end of the tree is provided with a longitudinally-oblong perforation, $m$, enlarged at its upper end. Into this is secured a fastening-bolt for securing the back-band to the saddle-tree. Said fastening-bolt is provided at one end with a head, $i$, which when exposed to view is more or less ornamental. Beneath the head the shank is enlarged, as at $j$, to receive the back-band and to hold the bolt-head in proper position above the tree. Next in turn the shank is provided with a narrower neck, $l$, to enter and be held in the smaller position of the slot; and, finally, at the opposite end the bolt has a shoe, $k$, adapted to enter through the larger portion of the slot, and when said bolt is drawn down into the smaller portion of the slot to hold said bolt to the tree, as will be understood.

Having thus described the invention, what I claim as new is—

1. A saddle-tree having side flanges and a plate arranged between said flanges, the said plate being secured at its opposite ends to the tree and forming a chamber between the tree or the plate, being longitudinally depressed for that purpose, said parts being arranged and combined substantially as and for the purposes set forth.

2. In combination with the depressed tree having bearings $a'$ $a'$, one of which is perforated to receive a tongue, $c$, a cover, $d$, having said tongue arranged in the perforated bearing, and having the opposite end secured to the other bearing, substantially as set forth.

3. The flanged tree having a depression in the length and flanges at the sides thereof, in combination with a cover arranged between said flanges and extending from one bearing formed by the depression to the other and thereat permanently fastened, substantially as and for the purposes set forth.

4. In combination, the tree having the oblong slot, the back-band, and a bolt provided with the ornamental head, a shank, and a shoe to engage the slotted tree, substantially as and for the purposes set forth.

5. In combination, in a saddle, a slotted tree, a back-band, and a bolt having a head, a shank provided with a smaller neck portion and a shoe, substantially as described, for the purposes set forth.

In testimony that I claim the foregoing I have hereunto set my hand this 17th day of February, 1885.

CHAS. E. CAHOONE.

Witnesses:
CHARLES H. PELL,
FREDK. F. CAMPBELL.